United States Patent
Kenney et al.

(10) Patent No.: US 6,510,601 B1
(45) Date of Patent: Jan. 28, 2003

(54) INVAR FORMING METHOD FOR MAKING TOOLING

(75) Inventors: Phillip E. Kenney, El Dorado, KS (US); Jeffrey D. Fletcher, Wichita, KS (US); Dennis R. Malone, Derby, KS (US); Lawrence B. Wilson, Winfield, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/528,328

(22) Filed: Mar. 20, 2000

(51) Int. Cl.[7] ................................................. B23P 25/00
(52) U.S. Cl. ....................................................... 29/462
(58) Field of Search ................................. 72/63, 60, 62, 72/709; 29/421.1, 428, 448, 462; 269/309, 289 R

(56) References Cited

U.S. PATENT DOCUMENTS

| | | | |
|---|---|---|---|
| 2,451,783 A | * 10/1948 | Sweeney | 29/448 |
| 3,935,633 A | * 2/1976 | Bunker | 29/462 |
| 4,348,798 A | * 9/1982 | Hutchison | 29/448 |
| 4,559,797 A | 12/1985 | Raymond | |
| 4,644,626 A | 2/1987 | Barnes et al. | |
| 4,657,717 A | 4/1987 | Cattanach et al. | |
| 4,792,318 A | * 12/1988 | Igaki et al. | 445/66 |
| 4,983,247 A | * 1/1991 | Kim | 156/272.2 |
| 4,984,348 A | * 1/1991 | Cadwell | 29/423 |
| 5,306,190 A | * 4/1994 | Spina et al. | 445/68 |
| 5,467,626 A | * 11/1995 | Sanders | 72/60 |
| 5,746,553 A | * 5/1998 | Engwall | 409/132 |
| 5,817,267 A | * 10/1998 | Covino et al. | 264/219 |
| 6,012,883 A | * 1/2000 | Engwall et al. | 29/745 |
| 6,024,555 A | * 2/2000 | Goodridge et al. | 425/394 |
| 6,168,358 B1 | * 1/2001 | Engwall et al. | 409/219 |

OTHER PUBLICATIONS

US 5,862,695, 1/1999, Beal et al. (withdrawn)

* cited by examiner

Primary Examiner—Gregory M. Vidovich
Assistant Examiner—Marc Jimenez
(74) Attorney, Agent, or Firm—Harness Dickey & Pierce P.L.C.

(57) ABSTRACT

A method for fabricating an Invar tool includes the step of superplastically forming an Invar facesheet for the tool. A tool header is provided, and the Invar facesheet is then formed with an SPF diaphragm driver to match the predetermined contour of the tool header. The Invar facesheet is then welded to the tool header. Forming the Invar facesheet is achieved by positioning the Invar facesheet between a superplastically formable diaphragm and a die having the predetermined contour. The diaphragm is heated to a predetermined superplastic temperature, and a predetermined pressure is applied to the diaphragm. Application of the predetermined pressure allows the diaphragm to cause the Invar facesheet to form against the predetermined contour of the die. Superplastically forming the Invar facesheet results in a negligible amount of excess scrap, reduces material costs, and reduces labor costs.

19 Claims, 7 Drawing Sheets

INVAR FORMING METHOD FOR MAKING TOOLING

TECHNICAL FIELD

The present invention relates generally to Invar tool fabrication. More particularly, the invention relates to a method for fabricating an Invar tool including the step of superplastically forming an Invar facesheet to match or to approximate a predetermined contour of the tool.

BACKGROUND OF THE INVENTION

BACKGROUND ART

Modern day aerospace, defense, and high tech research applications typically require complex, high precision, and close tolerance tooling. Thermal expansion is an area of particular concern in the aerospace industry with regard to tooling. For example, most military aircraft applications stipulate that tools exhibit minimal dimensional changes when subjected to extreme temperature variations.

In the campaign to control thermal expansion, a useful material has been developed under the tradename of Invar 36. Invar 36 ("Invar") is a nickel-iron alloy that has a rate of thermal expansion that is approximately one-tenth that of carbon steel at temperatures up to 400 degrees F. Invar therefore has a particular attractiveness in fabricating tool components, including a header, which serves as a "frame" for a tool, and a facesheet, which is welded to the header.

Several of our first approaches in developing the present invention were labor and material intensive. One such approach involved a stretch forming technique as shown in FIGS. 3 and 4. Specifically, a stretch form die was fabricated to a predetermined contour, and the Invar facesheet was stretched over the die surface. We considered this forming process to be unsuccessful as it required a substantial amount of excess Invar material for the jaws of the stretch press which are used to grip the facesheet. As the amount of this excess Invar material was typically equal to the amount of material that was required to make the facesheet, and as the excess material could not be used as the part of the tool, the excess Invar material needed to be trimmed, which led to substantial waste. Another one of our approaches involved bump forming thick Invar material, and cutting the material to fit the tool in segments. Yet another one of our approaches included the use of castings. This approach, however, was very expensive due to the need to eliminate porosity. It is therefore desirable to provide a method and assembly for fabricating an Invar tool with reduced labor and material costs.

SUMMARY OF THE INVENTION

A preferred method of the present invention for fabricating an Invar tool includes the step of providing a tool header defining a predetermined contour. An Invar facesheet is then superplastically formed to match, accurately or substantially, the predetermined contour of the tool header. Normally, the method further provides for welding the Invar facesheet to the tool header. Forming the Invar facesheet in this way results in less scrap, and therefore substantially reduces material costs. Forming the Invar facesheet in this way also leads to reduced labor costs.

The present invention further provides an Invar tool. The Invar tool includes a tool header defining a predetermined contour, and one or more Invar facesheets welded to the tool header. The Invar facesheets are formed with an SPF diaphragm driver to substantially match the predetermined contour of the tool header.

Further in accordance with the present invention, a method for molding parts on Invar tooling is provided. The method includes the step of making an Invar tooling surface from a sheet of Invar with SPF diaphragm forming. The sheet is placed on a tool header, and a part is formed against or on the tooling surface.

BRIEF DESCRIPTION OF THE DRAWINGS

The various advantages of the present invention will become apparent to one skilled in the art by reading the following specification and sub-joined claims and by referencing the following drawings in which:

DETAILED DESCRIPTION OF THE PREFERRED EMBODIMENTS

Figure 1:
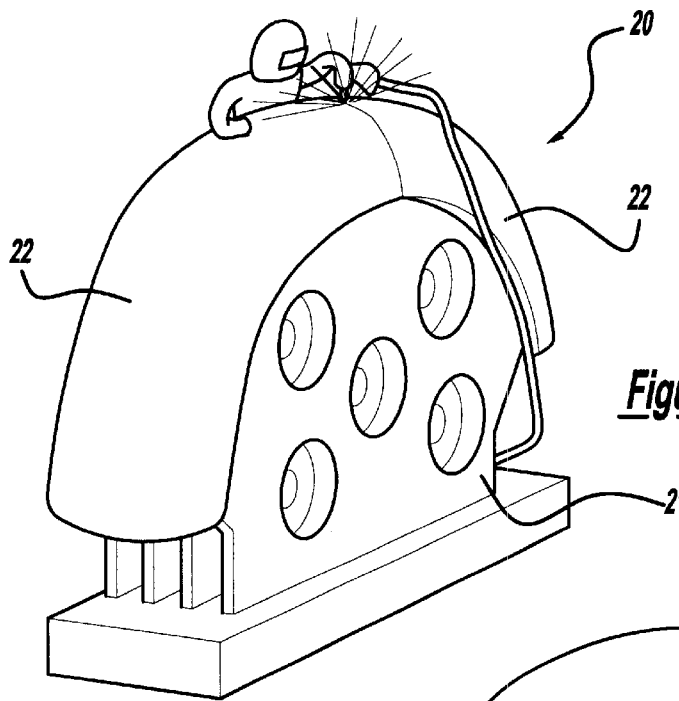
FIG. 1 is a perspective view of an Invar tool fabricated in accordance with the present invention.
Figure 2:
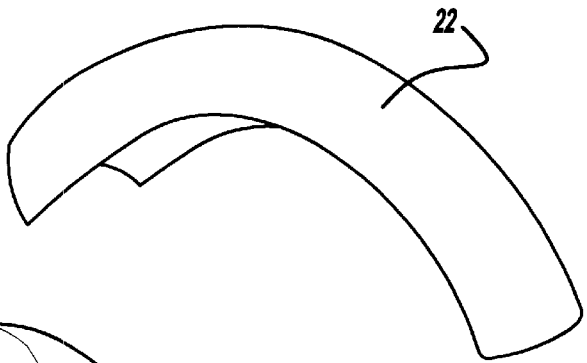
FIG. 2 is a perspective view of a superplastically formed Invar facesheet in accordance with the present invention.

Referring to FIGS. 1 and 2, an Invar tool 20 fabricated in accordance with the principles of the present invention includes a tool header 21 having a predetermined contour and an Invar facesheet 22. Invar facesheets 22 are preferably superplastically formed in a diaphragm forming process using an SPF alloy driver to match the predetermined final contour in segments. The segments are welded to the tool header 21 to define the forming surface of the tool and to complete the tool with minimal waste of the Invar.

Figure 3:
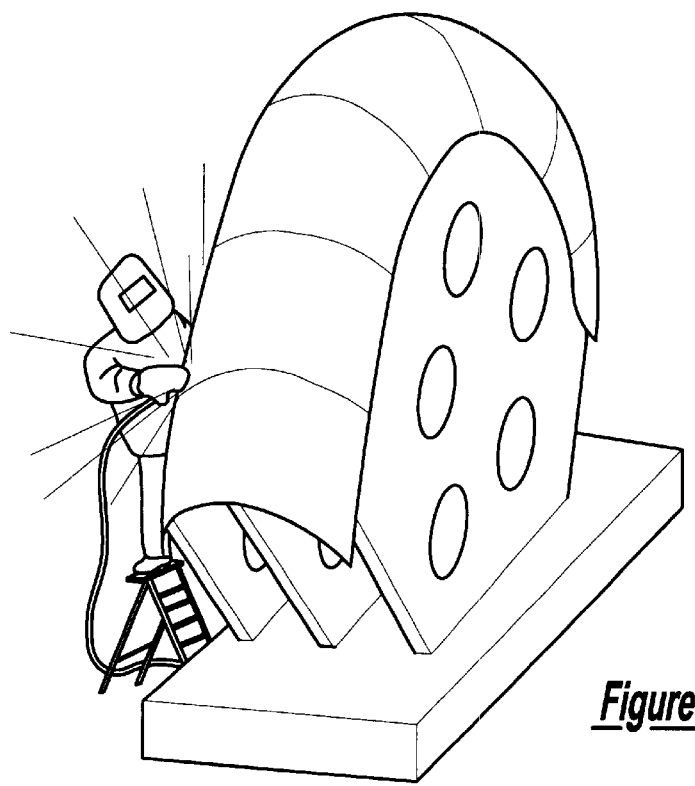
FIG. 3 is a perspective view of an Invar tool fabricated in accordance with one of our first approaches in developing the present invention.
Figure 4:
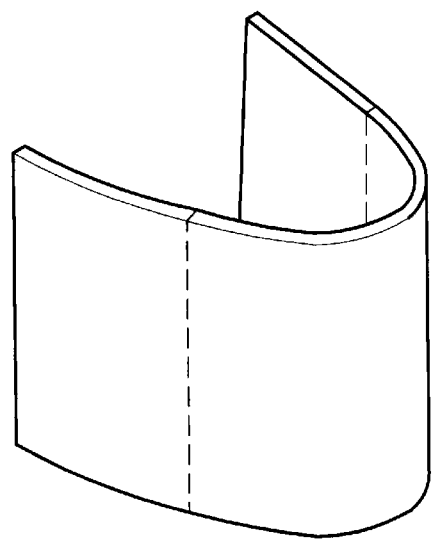
FIG. 4 is a perspective view of an Invar facesheet formed in accordance with one of our first approaches in developing the present invention.

FIG. 2 shows the Invar facesheet 22 in greater detail and demonstrates the advantages over conventional approaches. To more fully demonstrate the improvements provided by the present invention, FIGS. 3 and 4 show a conventional Invar tool 30 and conventional Invar facesheet 31 in accordance with previous manufacturing approaches. Specifically, it will be appreciated that the formed Invar facesheet 22 of the present invention is able to meet more complex contours than a conventional facesheet 31. As a result, fewer are needed and labor intensive welding is reduced. For example, seven sections of conventional facesheet 31 must be fabricated for the tool header 21, whereas only two superplastically formed Invar facesheets 22 are required for the same tool header 21. It will further be appreciated that the conventional facesheet 31 results in substantial waste to trim edges from the sheets following the stretch forming process.

Figure 5:
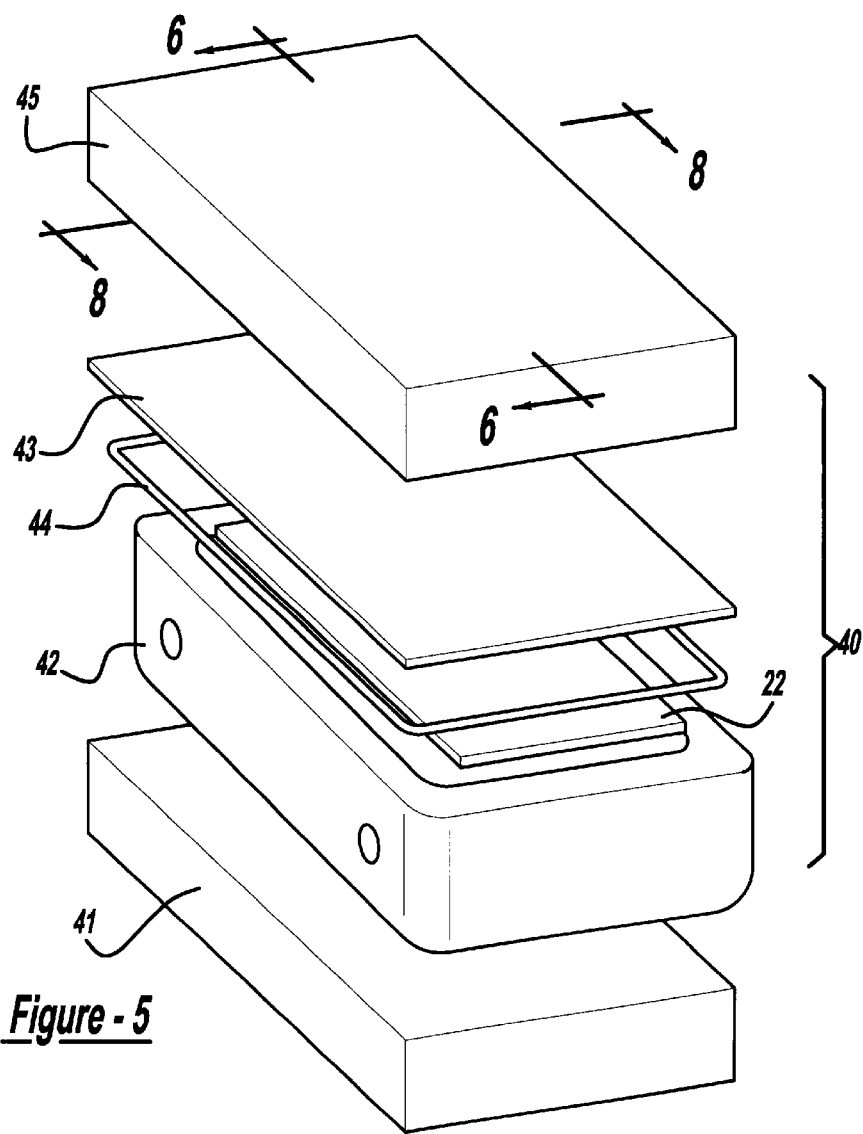
FIG. 5 is an exploded perspective view of a superplastic forming assembly in accordance with the present invention.

FIG. 5 shows a preferred superplastic forming assembly 40 of the present invention. The preferred superplastic forming (SPF) assembly 40 includes a press bed 41, and a die 42 coupled to the press bed 41. The die 42 has a predetermined contour corresponding to the Invar tool 20 (FIG. 1). The SPF assembly 40 further includes a superplastically formable diaphragm 43, and a sealing ring 44 positioned between the die 42 and the diaphragm 43. A press head 45 is coupled to the diaphragm 43. The press head 45 has an associated head weight, and applies a predetermined pressure to the diaphragm 43 such that the Invar facesheet 22 forms against the predetermined contour of the die 42. It will be appreciated that the head weight is sufficient to offset the reactive force of the predetermined pressure. Further details of a suitable SPF press are described in U.S. Pat. No. 5,467,626.

Figure 6A:
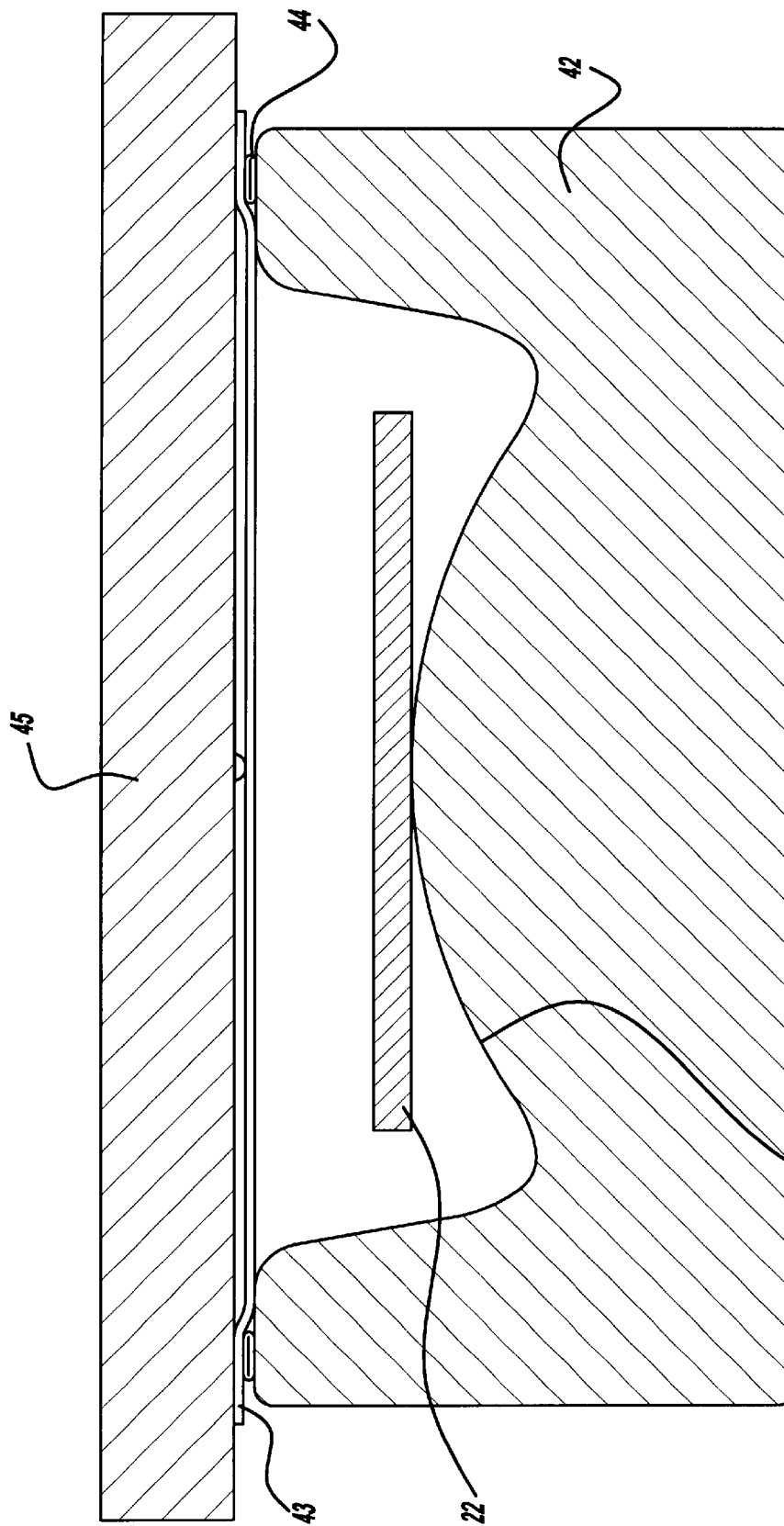
FIG. 6a is a cross-sectional side view taken along lines 6—6 in FIG. 5 of a superplastic forming assembly before fabrication in accordance with the present invention.
Figure 6B:
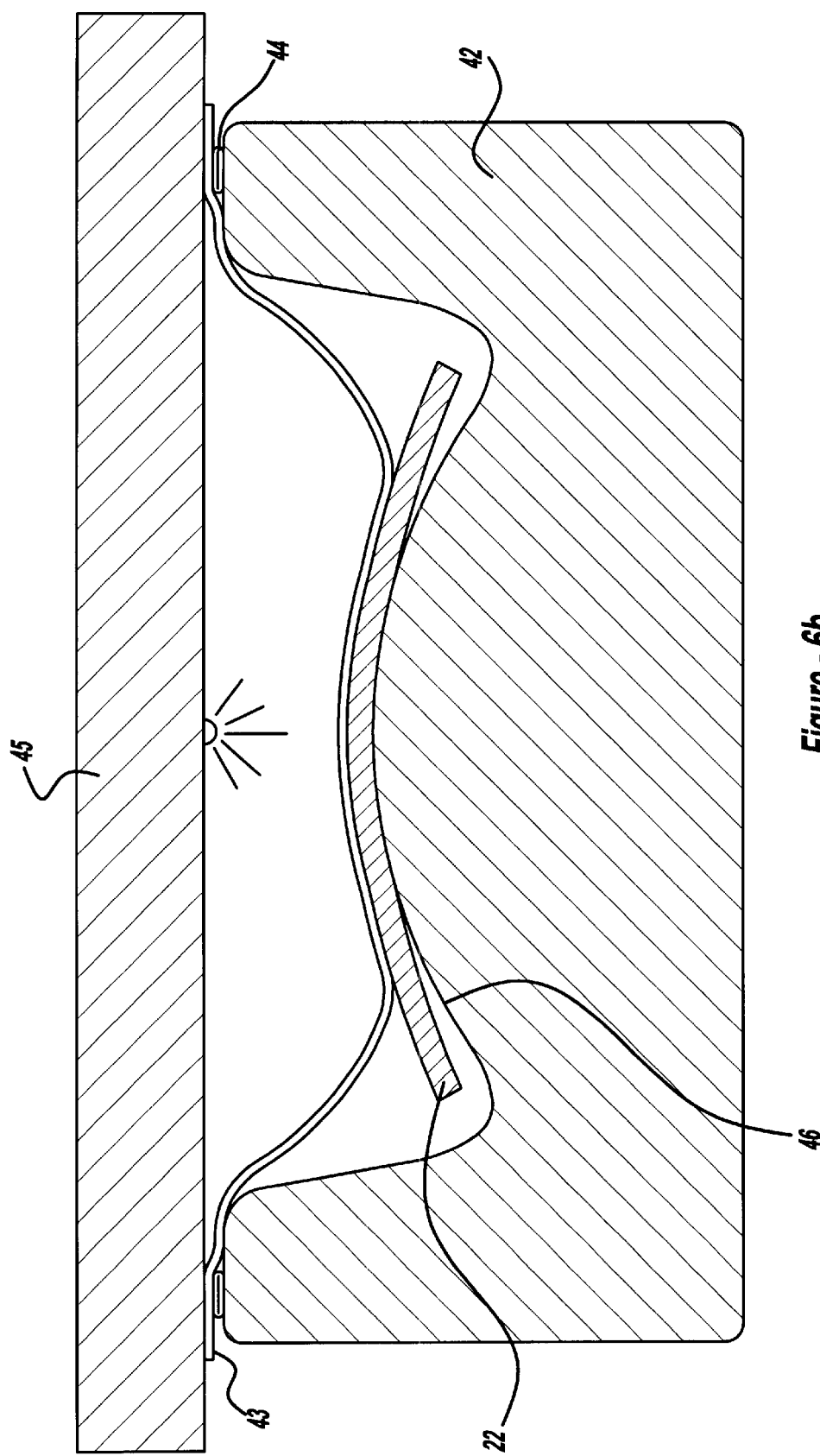
FIG. 6b is a cross-sectional side view taken along lines 6—6 in FIG. 5 of a superplastic forming assembly during fabrication in accordance with the present invention.
Figure 6C:
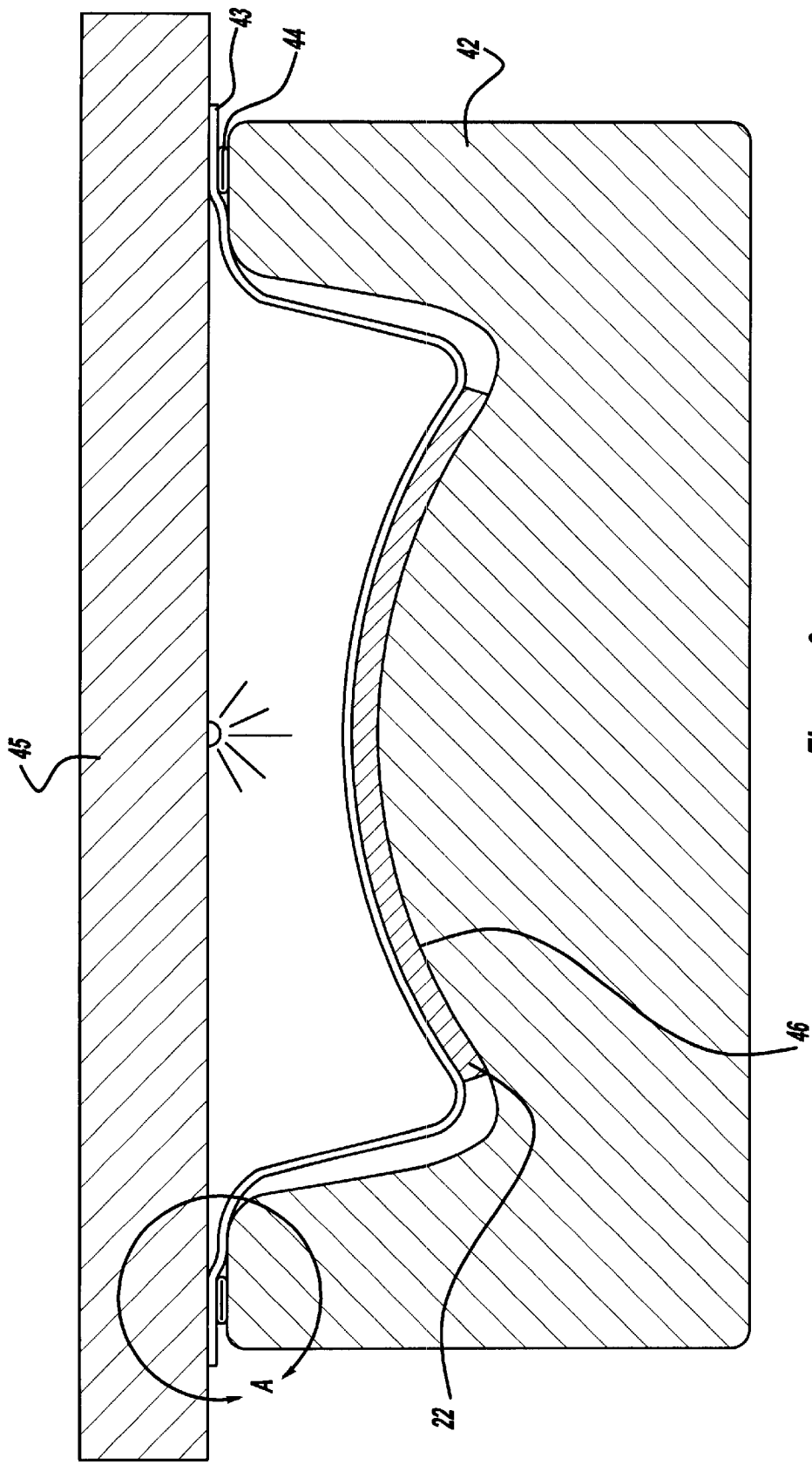
FIG. 6c is a cross-sectional side view taken along lines 6—6 in FIG. 5 of a superplastic forming assembly after fabrication in accordance with the present invention.

FIGS. 6a–6c demonstrate the process of forming the Invar facesheet 22 in greater detail. Specifically, the Invar facesheet 22 is positioned between the diaphragm 43 and the die 42 having the predetermined contour 46. The diaphragm 43 is a superplastic alloy, such as titanium. It is heated to a predetermined superplastic temperature, and a predetermined pressure is applied to the diaphragm 43 such that the diaphragm 43 causes the Invar facesheet 22 to form against the predetermined contour 46 of the die 42. The Invar facesheet softens at the SPF temperature, allowing it to be stretched with the diaphragm. In one embodiment, the diaphragm 43 includes titanium, and the predetermined pressure is applied via argon gas. Superplastically forming the Invar facesheet 22 allows the Invar facesheet 22 to be profiled to accommodate the predetermined contour 46 before forming and results in a substantial reduction in material waste. An important aspect of the SPF process involves proper forming of the die 42 to allow unrestricted fabrication of the Invar facesheet 22.

Figure 8:
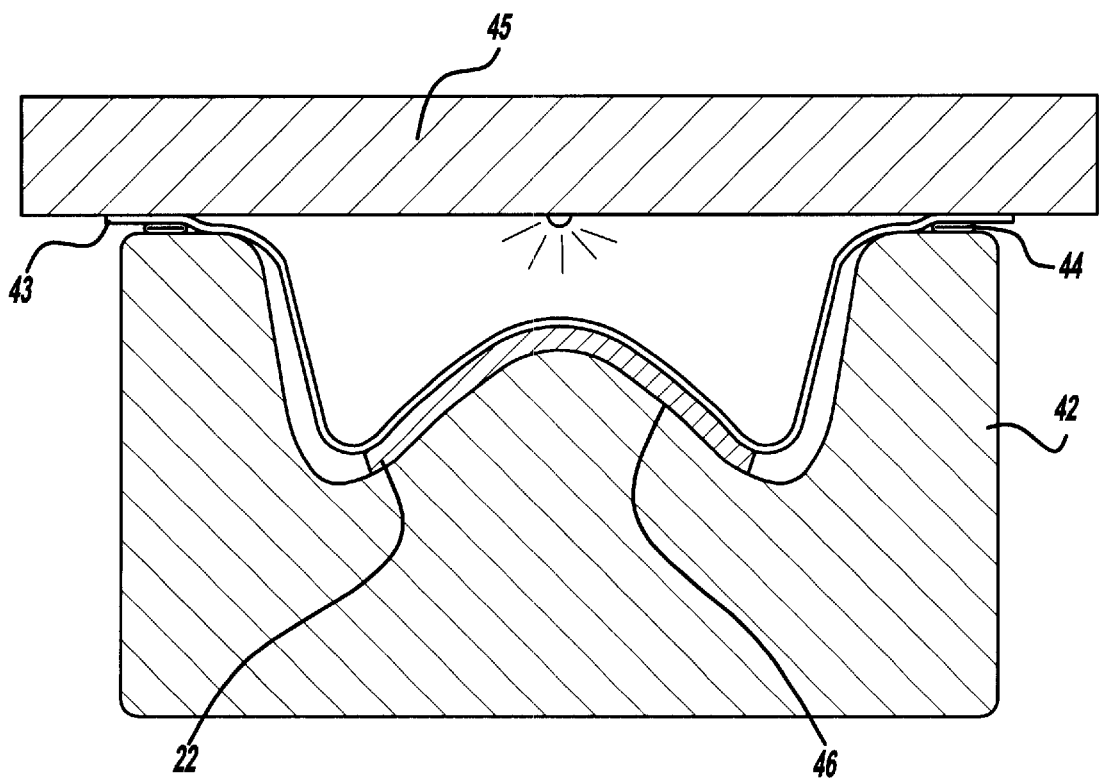
FIG. 8 is a cross-sectional side view taken along lines 8—8 in FIG. 5 of a superplastic forming assembly in accordance with the present invention.

Thus, the Invar facesheet 22 transitions from a flat shape as shown in FIG. 6a, to a partially formed shape as shown in FIG. 6b, to a finally formed shape as shown in FIG. 6c. It is also important to note that as shown in FIG. 8, the Invar facesheet 22 can be formed in multiple directions as dictated by the predetermined contour 46. This increased ability to customize the Invar facesheet is highly desirable over conventional stretch forming approaches to Invar tool fabrication.

Figure 7:
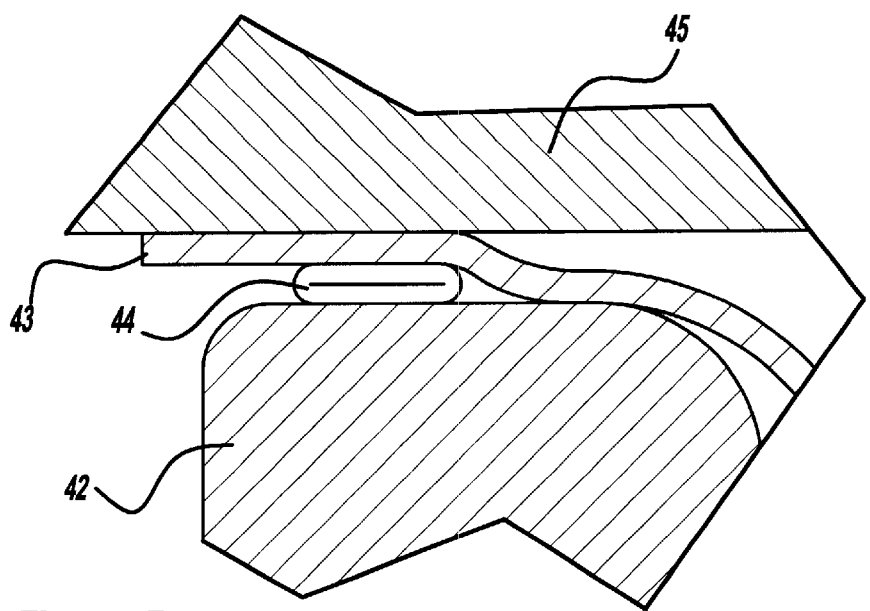
FIG. 7 is an enlarged side view of area A shown in FIG. 6c.

FIG. 7 shows that the sealing ring 44 undergoes compression in response to the head weight of the press head 45. The sealing ring 44 is preferably made of stainless steel and adds stability to the overall SPF process.

Figure 9:
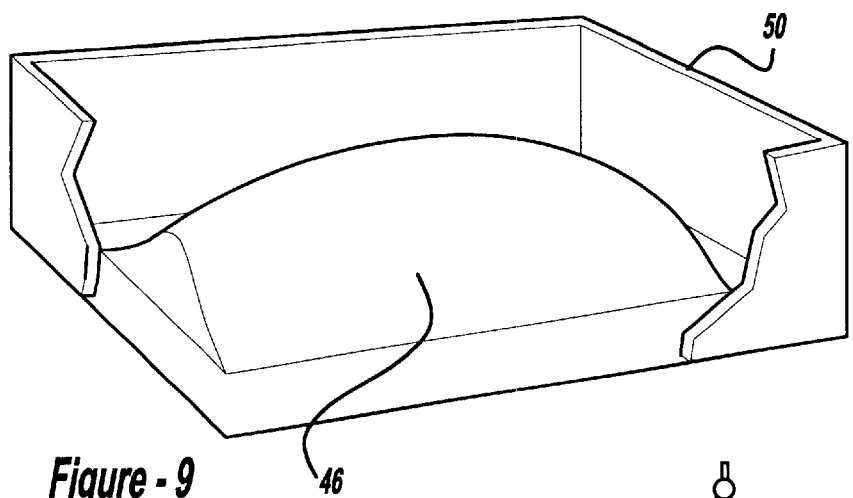
FIG. 9 is a perspective view of a mold for a ceramic die in accordance with the present invention.
Figure 10:
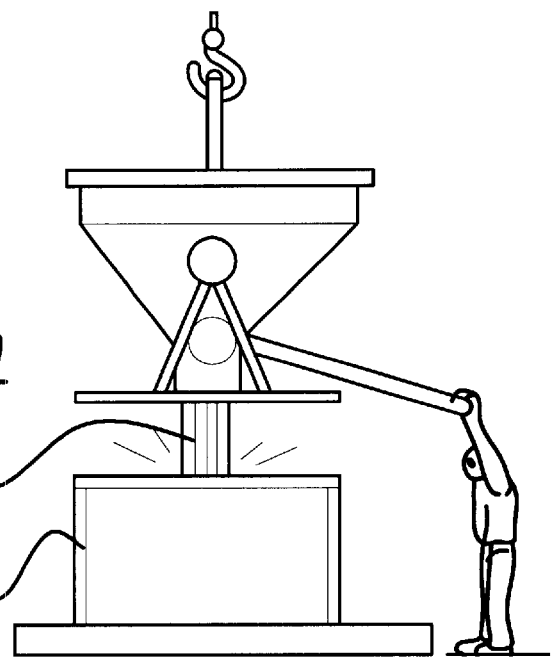
FIG. 10 is a side view of a process for pouring a ceramic castable material into the mold shown in FIG. 9.
Figure 11:
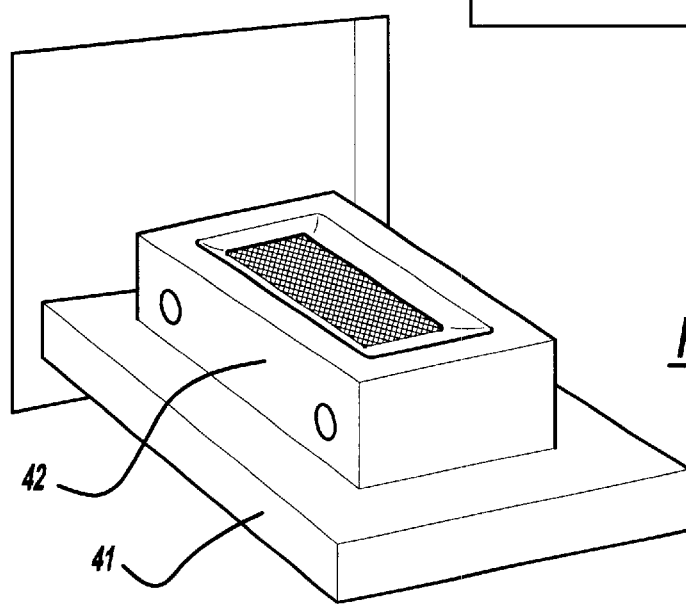
FIG. 11 is a perspective view of a ceramic die loaded onto a press bed in accordance with the present invention.

It is preferred that the die 42 be formed from a ceramic castable material, as described in U.S. Pat. No. 5,467,626. Thus, as shown in FIG. 9, the process of forming the die 42 includes the step of creating a mold 50 having the predetermined contour 46. FIG. 10 demonstrates that the ceramic castable material 51 is poured into the mold 50. The ceramic castable material 51 is then allowed to set into the ceramic die 42, and the ceramic die 42 is demolded. As shown in FIG. 11, the ceramic die 42 is cured at the predetermined superplastic temperature, and loaded onto the press bed 41. In one embodiment, the predetermined superplastic temperature is approximately 1650 degrees F., and the predetermined pressure of the argon gas is approximately 90–180 psi. Curing the ceramic die 42 at the predetermined superplastic temperature insures that the ceramic die 42 will not undergo undesirable thermal expansion during the SPF process.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A method for fabricating an Invar tool having a tooling surface, the method comprising the steps of:

providing a tool header defining a predetermined concave contour;

forming an Invar facesheet with an SPF diaphragm driver in a superplastic forming operation such that a first side of the Invar facesheet substantially conforms to the predetermined concave contour of the tool header and a second side of the Invar facesheet substantially conforms to a convex contour of the tooling surface; and attaching the Invar facesheet to the tool header such that the attached Invar facesheet defines at least a portion of the tooling surface.

2. The method of claim 1 further including the steps of:

positioning the Invar facesheet between a superplastically formable diaphragm and a die having the predetermined contour;

heating the diaphragm and the facesheet to a predetermined superplastic temperature; and applying a predetermined pressure to the diaphragm such that the diaphragm forms into the die superplastically and causes the Invar facesheet to form against the predetermined contour of the die.

3. The method of claim 2 further including the step of profiling the Invar facesheet to accommodate the predetermined contour.

4. The method of claim 2 further including the step of forming the die to allow unrestricted forming of the Invar facesheet.

5. The method of claim 4 further including the step of forming the die from a ceramic castable material.

6. The method of claim 5 further including the steps of:

creating a mold having the predetermined contour;

pouring the ceramic castable material into the mold;

allowing the ceramic castable material to set into a ceramic die;

demolding the ceramic die;

curing the ceramic die at the predetermined superplastic temperature; and loading the ceramic die onto a press bed.

7. The method of claim 2 further including the steps of:

positioning a sealing ring between the diaphragm and the die; and positioning the sealing ring and the diaphragm between the die and a press head having an associated head weight, the press head applying the predetermined pressure to the diaphragm and the head weight being sufficient to offset the predetermined pressure.

8. The method of claim 2 wherein the predetermined superplastic temperature is approximately 1650 degrees F.

9. The method of claim 2 further including the step of applying argon gas to the diaphragm.

10. The method of claim 9 wherein the predetermined pressure of the argon gas is approximately 90–180 psi.

11. The method of claim 1, further comprising the steps of:

forming a second Invar facesheet with one of the SPF diaphragm driver and a second SPF diaphragm driver such that a first side of the second Invar facesheet substantially conforms to the predetermined contour of the tool header and a second side of the second Invar facesheet substantially conforms to the contour of the tooling surface; and welding the second Invar facesheet to the tool header and the Invar facesheet such that the second Invar facesheet defines a second portion of the tooling surface.

12. A method for forming an Invar facesheet for an Invar tool having a predetermined contour, the method comprising the steps of:

positioning the Invar facesheet between a superplastically formable diaphragm and a die having the predetermined contour;

heating the diaphragm to a predetermined superplastic temperature; and applying a predetermined pressure to the diaphragm such that the diaphragm forms superplastically into the die and causes the Invar facesheet to form against the predetermined contour of the die wherein the Invar facesheet is formed to include a first side having a convex shape that is configured to conform to a predetermined tooling surface and a second side having a concave shape that is configured to conform to a surface of a tool header.

13. The method of claim 12 further including the step of profiling the Invar facesheet to accommodate the predetermined contour.

14. The method of claim 12 further including the step of forming the die to allow unrestricted forming of the Invar facesheet.

15. The method of claim 14 further including the step of forming the die from a ceramic castable material.

16. The method of claim 15 further including the steps of:

creating a mold having the predetermined contour;

pouring the ceramic castable material into the mold;

allowing the ceramic castable material to set into a ceramic die;

demolding the ceramic die;

curing the ceramic die at the predetermined superplastic temperature; and loading the ceramic die onto a press bed.

17. The method of claim 15 wherein the ring includes stainless steel.

18. The method of claim 12 further including the steps of:

positioning a sealing ring between the diaphragm and the die; and positioning the sealing ring and the diaphragm between the die and a press head having an associated head weight, the press head applying the predetermined pressure to the diaphragm and the head weight being sufficient to offset the predetermined pressure.

19. The method of claim 12 wherein the diaphragm includes titanium.

* * * * *